May 15, 1934.　　　O. U. ZERK　　　1,958,557
LUBRICANT RESERVOIR AND DASH PUMP
Filed Jan. 15, 1927　　　3 Sheets-Sheet 1
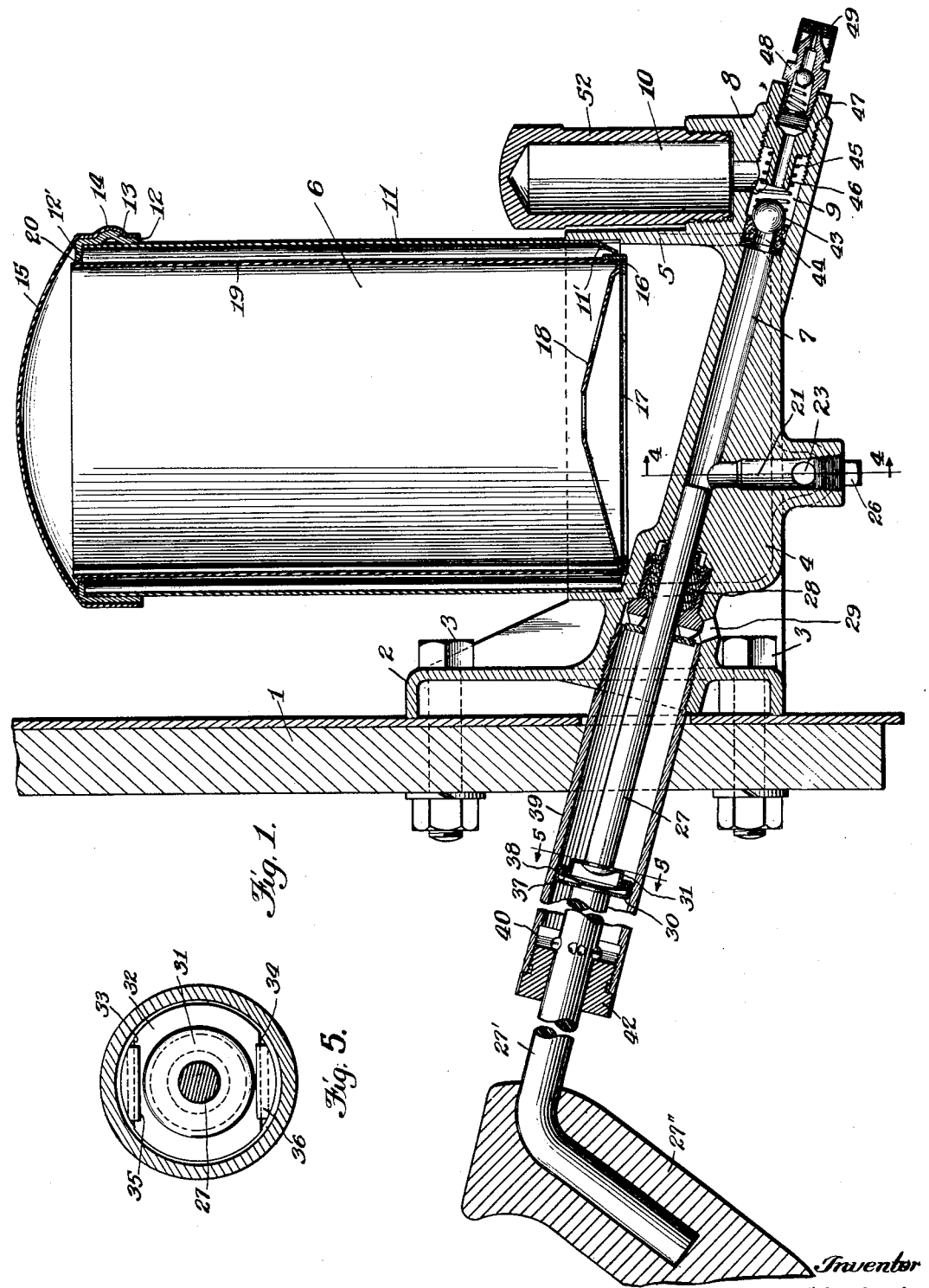

May 15, 1934.  O. U. ZERK  1,958,557
LUBRICANT RESERVOIR AND DASH PUMP
Filed Jan. 15, 1927   3 Sheets-Sheet 2
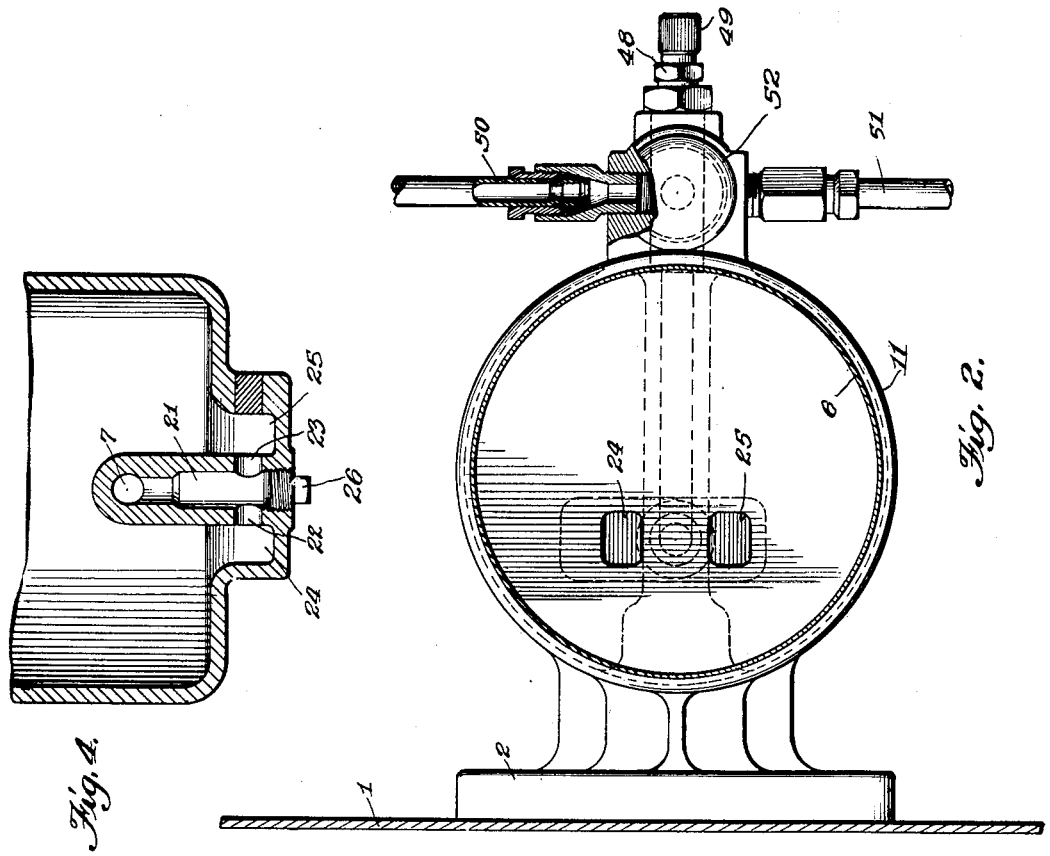
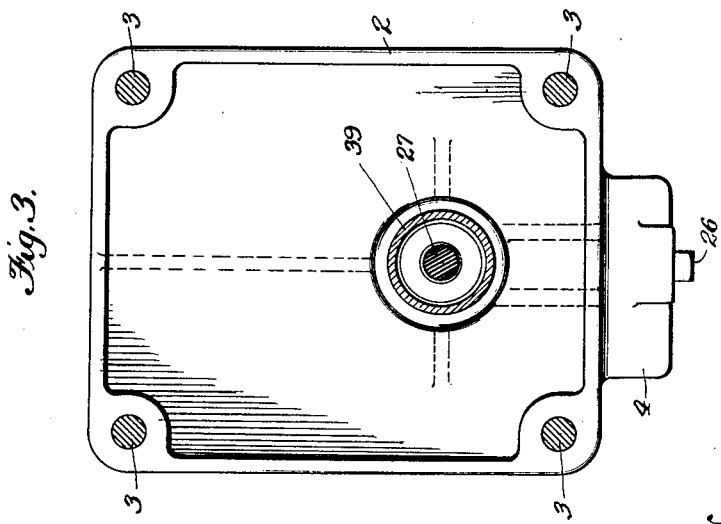
Inventor
Oscar U. Zerk.
By Williams, Bradbury,
McCaleb & Hinkle
Attys.

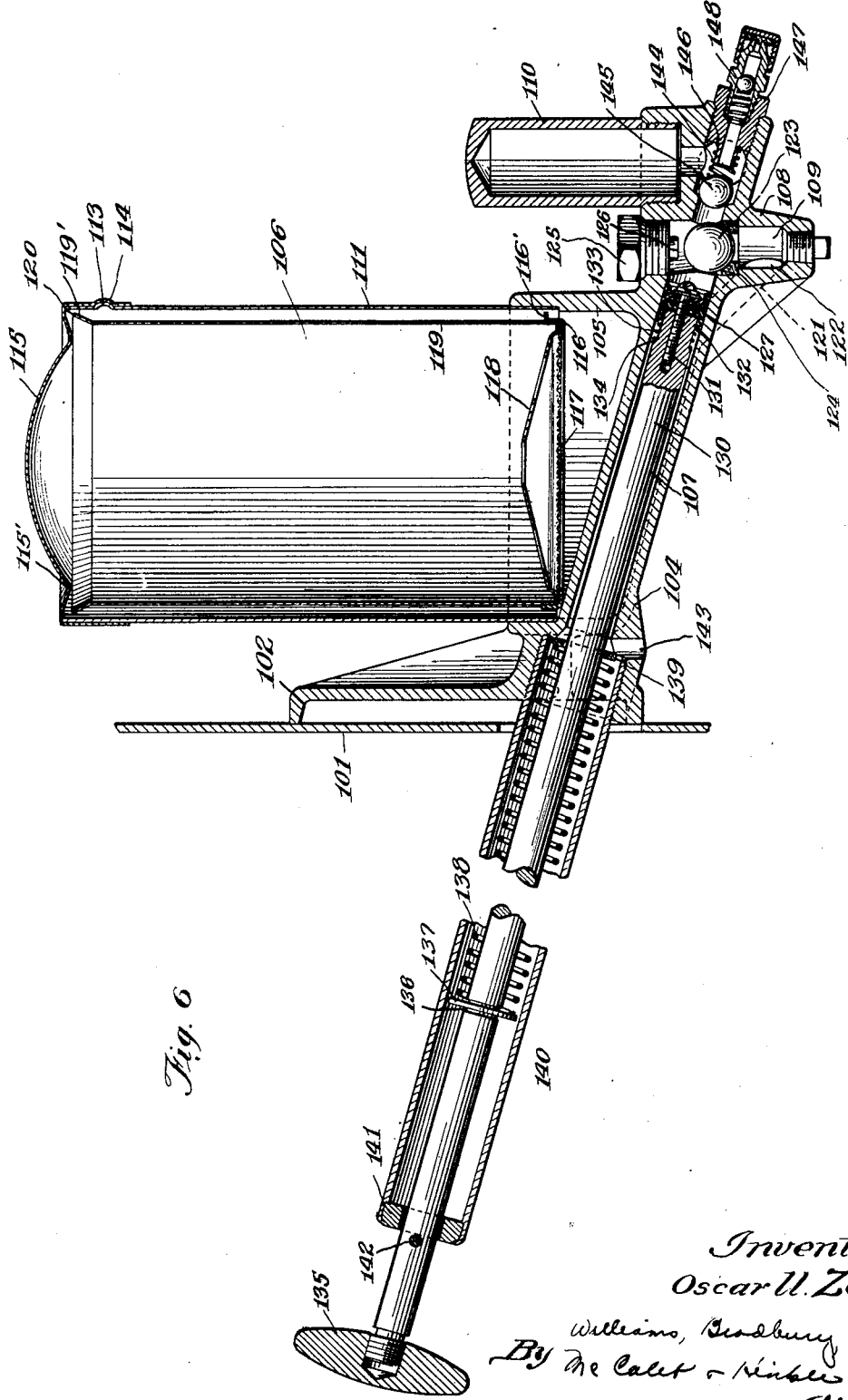

Patented May 15, 1934

1,958,557

UNITED STATES PATENT OFFICE 1,958,557

LUBRICANT RESERVOIR AND DASH PUMP

Oscar U. Zerk, Chicago, Ill., assignor, by mesne assignments, to Alemite Corporation, Chicago, Ill., a corporation of Delaware Application January 15, 1927, Serial No. 161,282

7 Claims. (Cl. 184—28)

My invention relates to a lubricating system of the so-called centralized type wherein a plurality of bearings are lubricated from a common source of supply. Centralized systems of lubrication comprise in general a reservoir or other source of lubricant supply, branched conduits leading to the bearings to be lubricated and having metering means located therein adjacent the bearings to regulate the amount of lubricant supplied to each bearing, and a pump or similar means for withdrawing lubricant from the reservoir and forcing it through the conduits and into the bearings. Lubricating systems of the centralized type are now being applied to automotive vehicles to lubricate the chassis bearings thereof, and it is for such use that my invention was primarily designed.

In the usual operation of automotive vehicles the chassis bearings are in constant use during the operation of the vehicle, but these bearings are only lubricated at long intervals, which intervals should bear some relation to the amount and kind of service to which the vehicle has been subjected, but are more likely to depend upon the whim or memory of the operator. For conditions of this kind it is desirable to provide a heavy lubricant which will stay with the bearing for a long time, and also to supply such lubricant to the bearing under a sufficiently high pressure to force out the residue of previous charges of lubricant which have become hardened or frozen therein. My new and improved apparatus is designed to accomplish these desideratums.

An object of my invention is to provide a lubricant reservoir and pump unit for supplying lubricant at high pressures to the conduits of a centralized lubricating system.

Another object is to provide a combined lubricant reservoir and pump which is compact and simple in construction, economical to manufacture, and reliable in operation.

Another object is to provide a combined lubricant reservoir and pump adapted to be mounted on a partition separating the operative units of an automotive vehicle from the driver's compartment and in which the oil is maintained on the side with the operating units and prevented from passing to the driver's side of said partition.

Another object is to provide a new and novel lubricant pump which can be manually operated to provide extremely high pressures.

Another object is to provide a manually actuated supply unit which will continue to force lubricant to the bearings after the cessation of such manual actuation.

Another object is to provide a combined lubricant reservoir and pump wherein the pump cylinder is located entirely within the reservoir.

Another object is to provide a supply unit which may be easily adapted to supply different amounts of lubricant.

Another object is to provide a combined lubricant reservoir and pump having an air chamber associated therewith for forcing lubricant to the bearings at high pressure over an extended period of time.

Another object is to provide a lubricant reservoir having a strainer therein and means whereby air trapped beneath said strainer, when the reservoir is filled, may escape during the filling operation.

Another object is to provide a novel type of pump.

Another object is to provide a pump and operating means therefor in which the operating means need not be maintained in alignment with the pump piston.

Another object is to provide means whereby the lubricating system may be primed and air trapped therein discharged under high pressure.

Other objects and advantages will appear as the description proceeds.

Referring to the drawings,

Fig. 1 is a vertical section of my new and improved lubricant reservoir and pump;

Fig. 2 is a plan view of the righthand half of Fig. 1 with the reservoir cover removed;

Fig. 3 is a vertical section taken on the plane of the dash in Fig. 1 and looking to the right in said Figure;

Fig. 4 is a section on the line 4—4 of Fig. 1;

Fig. 5 is a section on the line 5—5 of Fig. 1; and

Fig. 6 is a view similar to Fig. 1 and showing a different embodiment of the invention.

Referring to that embodiment of the invention shown in Figs. 1 to 5, inclusive, I have shown the dash of an automotive vehicle at 1, it being understood that such dash separates the engine compartment from the driver's compartment, that part of Fig. 1 to the right of the dash being in the engine compartment, and that of Fig. 1 to the left of the dash being in the driver's compartment.

My combined lubricant reservoir and pump is supported by a bracket 2 secured to the dash by bolts 3, or any other suitable fastening means. The bracket 2 forms one part of a unitary casting 4 having a part 5 forming the base of the reservoir 6 and also forming the pump cylinder 7, and an extension 8 forming a valve chamber 9 and a support for an air chamber 10.

On the reservoir base 5 is supported a thin metallic shell 11 comprising the main part of the reservoir 6 and having soldered, or otherwise secured, to the upper edge thereof a ring 12 having a projection 13 engaging with an indentation 14 in the cover 15 for maintaining the cover firmly on the upper end of the reservoir. The ring 12 and the cover 15 are both metal stampings and can be cheaply made with sufficient accuracy to provide a lubricant tight seal therebetween which will effectively prevent the leakage of any lubricant from the top of the reservoir.

In the lower part of the reservoir is positioned a cup-like ring 16 supporting a strainer 17 of fine wire mesh, or other suitable material, and protected by a conical perforated plate 18. The ring 16 is centered in the reservoir by means of the bent-in portions 11' of the reservoir shell 11 and said ring carries a tubular inner shell 19 held in spaced relation to the side of the reservoir by the cup-like ring 16 and the lateral flange 12' of the ring 12. A small space 20 is provided between the flange 12' and the inner shell 19 and this space is of such width that lubricant will not pass downwardly therethrough when the reservoir is filled, but any air trapped beneath the strainer 17 by the incoming lubricant may pass upwardly between the inner and outer shells and escape through such space. This provision of means for permitting the free escape of air trapped beneath the strainer when the reservoir is filled, is very important where lubricant of high viscosity is used since it eliminates the trapping of air in the bottom of the reservoir and the subsequent forcing thereof into the system with the resulting formation of air slugs and air pockets in the various conduits.

I have found it desirable to provide a pump which will supply lubricant to the conduits at extremely high pressure and yet can be easily operated by the average driver of automotive vehicles. In order to accomplish this purpose I provide a pump having a cylinder 7 located entirely inside the reservoir 6 and of a diameter proportional to the pressure which it is desired to obtain. I have found that a pressure of 2,000 pounds per square inch may be easily obtained by the average person where the diameter of the cylinder is $\frac{7}{16}$ths of an inch, and that by reducing the diameter of the cylinder to $\frac{5}{32}$nds of an inch this pressure can be easily increased to over 5,000 pounds per square inch. It will thus be seen that by merely varying the diameter of the cylinder, my pump may be designed to produce any desired pressure.

The cylinder 7 of the pump communicates with the interior of the reservoir 6 through a conduit 21 located directly beneath the cylinder and communicating through passages 22 and 23 with wells 24 and 25 formed in the base of the reservoir. A removable plug 26 is located in the lower end of the conduit 21 and provides means for draining the reservoir. The pump plunger comprises a rod 27 slidable in said cylinder and acting as a valve to cut off communication between the cylinder and the reservoir. This plunger passes through a packing gland 28, located at the rear of the cylinder, the gland 28 serving to prevent leakage of lubricant past the plunger and out the rear end of the cylinder. A drain 29 is located directly in the rear of this gland and in front of the dash 1, so that any lubricant which does succeed in leaking past the packing will drain into the engine compartment of the vehicle and not pass into the driver's compartment thereof where it might soil the clothes of the occupants.

The plunger 27 is operated by a rod 27' having a handle 27'' shaped like the handle of a pistol and conveniently located for operation by the driver of the vehicle. The plunger 27 and the rod 27' are connected by a universal joint 30 which makes it unnecessary that the rod 27' be maintained in exact alignment with the plunger 27 thereby eliminating the tendency which normally exists in pumps of this type, for lateral movement of the handle to misalign the plunger 27 and destroy the effectivness of the pump. The universal joint 30 comprises a connecting member 31 secured to the plunger 27 and having an outwardly extending flange 32 cut away on opposite sides 33 and 34 to permit the clamping fingers 35 and 36 of the connecting element 37 to engage the flange 32. This connecting element 37 is attached to the rod 27' and a resilient member 38 is interposed between the member 37 and the flange 32 in order to maintain the fingers 35 and 36 firmly pressed against the other side of said flange.

From the above description considered in connection with the drawings, it will be apparent that the universal joint 30 may be assembled or disassembled by sliding the rod 27' laterally relative to the plunger 27 thereby causing the fingers 35 and 36 to slide from under the flange 32. The universal joint 30 slides in and is protected by a sleeve 39 screwed into the casting 4 adjacent the bracket 2, and the rod 27' is provided with pinched-up portions 40 which engage the plug 42 screwed into the end of the sleeve 39 and prevent the operator from pulling the plunger out of the cylinder 7.

The valve chamber 9 located at the forward end of the cylinder 7 and communicating therewith, has located therein a check valve 43 normally held against its seat 44 of hard fiber or other suitable material by a spring 45. The other end of the spring is guided by a tubular extension 46 on a plug 47 screwed into the end of the chamber opposite the cylinder 7. The plug 47 may be readily removed for inspection of the valve 43 and its seat 44 and also acts as a means for carrying a valve nipple 48 of the type disclosed in my Patent 1,475,980. A high pressure lubricant dispenser may be connected to the nipple 48 for blowing air out of the system or for initially priming said system. A cap 49 is provided for the nipple 48 to prevent the entry of dust into said nipple.

Extending from opposite sides of the valve chamber 9 are the conduits 50 and 51 leading to the bearings to be lubricated, and above said chamber and in communication therewith is an air chamber 10 of a size suitable for the use to which the apparatus is designed to be put. This air chamber is formed by a hollow member 52 screwed into the part 8 of the casting 4, and this member 52 may be readily replaced by a similar member of different capacity in order to adapt my lubricant reservoir and pump for a system requiring larger or smaller quantities of lubricant.

In operating the embodiment of my invention shown in Figs. 1 to 5, inclusive, the cover 15 is first removed and lubricant poured into the reservoir 6, the lubricant passing downwardly in the shell 19 and air located beneath the strainer 17 passing upwardly between said shell 19 and the outer shell 11. The cover 15 is then replaced and forms a lubricant tight seal with the ring 12, and the handle 27″ is reciprocated several times by the operator to fill the system with lubricant. Instead of using the manually operated pump for this purpose, the cap 49 on the nipple 48 may be removed and an independent dispensing means connected therewith for initially filling the conduits with lubricant. After the conduits are once filled with lubricant, each reciprocation of the plunger 27 will tend to force lubricant to the bearings and the resistance of the bearings and their associated metering devices will cause the lubricant discharged by the plunger 27 to back up into the air chamber 10 and compress the air in the upper part of said chamber. Continued reciprocation of the handle 27″ will cause the pressure thus built up in the air chamber to reach a high maximum depending upon the design of the pump and the resistance offered by the bearings. The check valve 43 prevents the pressure created in the chamber 10 from re-acting upon the cylinder 7 and permits the air compressed in the upper part of the chamber 10 to continue to exert pressure on the lubricant in the bottom thereof and in the conduits 50 and 51 until the quantity of lubricant supplied thereto by the pump has been forced through the bearings supplied by the system.

It will thus be seen that the operation of my new and improved lubricant reservoir and pump unit provides means for rapidly building up a supply of lubricant under high pressure and provides means for forcing this lubricant to the bearings over an extended period of time.

That embodiment of my invention shown in Fig. 6 is generally similar in construction and operation to the embodiment shown in Figs. 1 to 5, inclusive. In this embodiment, my combined lubricant reservoir and pump are carried by a bracket 102 secured to the dash 101 by any well known fastening means. The bracket 102 forms part of an integral casting 104 having a part 105 forming the base of the reservoir 106 and also forming the cylinder 107, and a part 108 extending in front of the reservoir 106 and forming valve chambers 109 and 144 and a support for an air chamber 110.

As in the previous embodiment, the reservoir 106 has an outer shell 111 and an inner shell 119, the outer shell being supported by the base 105 and having a projecting portion 113 to co-operate with a corresponding depressed portion 114 in the cover 115 for maintaining the cover on the top of the reservoir. In the lower ends of the reservoir is a cup-like ring 116 having centering lugs 116′ and carrying a strainer 117 protected by perforated conical plate 118. The lower end of the inner shell 119 rests in the ring 116 and the upper end of the shell 119 is flared at 119′, said flare acting as means for centering the upper end of said shell in said reservoir and further providing an air vent space 120, similar in purpose to the space 20 in the embodiment shown in Fig. 1. The cover 115 is provided with a depressed annular portion 115′ extending below the upper end of the flared portion 119′ and serving to return to the interior of the reservoir any lubricant which may collect on the cover 115 and thus prevent such lubricant from seeping out between said cover and the outer shell 111.

As in the preceding embodiment the cylinder 107 is located entirely within the bottom of the reservoir 106, but in this instance the forward end of the cylinder communicates with said reservoir through the valve chamber 109 and downwardly extending passages 121 and 122 connecting the bottom of said valve chamber with the bottom of the reservoir and as shown more fully in my co-pending application Case 59, Serial No. 161,281 filed of even date herewith. In the valve chamber is a check valve 123 co-operating with a seat 124 of fibre or other suitable material. Above the check valve 123 is a removable plug 125 which permits ready access to the check valve and its seat. The plug 125 is provided with a boss 126 adapted to center the upper end of a spring for assisting in maintaining the check valve 123 on its seat where the use of such a spring is desirable.

In the cylinder 107 is a piston 127 comprising oppositely extending cup-shaped washers of leather, or other suitable material, and separated by a metallic washer and secured to the reduced end of the piston rod 130 by a screw 131. A rigid transversely inclined washer 132 is pressed against the edge of the inner cup washer by means of a spring 133 resting against a washer 134 abutting the shoulder formed by the reduced end of the piston rod 130. The spring 133 and the rigid washer 132 act to force the edge of the flexible cup-shaped washer against the cylinder and effectively prevent any leakage of air into said cylinder during the suction stroke of the plunger. The outer end of the rod 130 is threaded for the reception of a handle 135 on the operator's side of the dash 101 and conveniently located for manual operation. The rod 130 is also provided with an annular groove 136 in which is located a washer 137 receiving the thrust of a spring 138, the opposite end of which abuts a washer 139 resting against the end of the cylinder 107. The spring 138 is surrounded and protected by a sleeve 140 screwed into the casting 104 adjacent the bracket 102. The outer end of the sleeve 140 is closed by an annular member 141 which serves to limit the outward movement of the piston 129 under the thrust of the spring 138 and which also co-operates with the pin 142 carried by the piston rod 130 to limit the inward stroke of the piston. Just in front of the sleeve 140 and in rear of the cylinder 107 is a drain 143 which permits any lubricant leaking past the piston 127 to fall into the engine compartment instead of leaking into the operator's compartment where it might soil the clothes of the occupants thereof.

In front of the valve chamber 109 and in communication therewith is a second valve chamber 144 having a check valve 145 acting under the urge of a spring 146 resting against a plug 147. The plug 147 carries a nipple 148 to which may be connected a lubricant dispenser for priming the system or forcing air therefrom at high pressure. The conduits leading to the bearings are connected to opposite sides of the chamber 144 in a manner similar to that shown in Fig. 2 of the drawings, and above this chamber is located an air chamber 110 of any suitable size and similar to the air chamber 10 previously described.

The operation of this embodiment of the invention is generally similar to the operation of the embodiment shown in Figs. 1 to 5, inclusive. In this embodiment, however, the cylinder 107 is normally disconnected from the reservoir 106 by the check valve 123, and this check valve controls communication between the cylinder and the reservoir, whereas in the preceding embodiment the plunger 27 performed this function. In the present embodiment also the handle 135 need only be manually operated in one direction, that is, on the operative stroke of the piston; the spring 138 serving to return the piston to its initial position.

From the preceding description it will be readily apparent that the embodiment of the invention disclosed in Fig. 6 is equally fitted for operation by either the hand or foot of the operator and may be so located as to be readily accessible to either or both of said members.

Having thus illustrated and described my invention, what I claim is:

1. A supply unit for centralized lubricating systems comprising a lubricant reservoir, means for discharging said lubricant at high pressure, means for storing the lubricant thus discharged and maintaining it under pressure until utilized by the bearings to be lubricated, and coupling means in communication with said storing means, said coupling means permitting priming of said system and the discharge of air undesirably trapped therein.

2. A supply unit for a centralized lubricating system comprising a base casting having a cylinder formed therein and a part adapted to serve as a bracket for attaching said casting to a suitable support, a sheet metal shell permanently mounted on said base and cooperating therewith to form a reservoir, a passageway connecting said cylinder with said reservoir, a valve chamber formed in said base at the discharge end of said cylinder, and an air chamber mounted on said base and communicating with said valve chamber.

3. A supply unit for a centralized lubricating system comprising a base casting having a part formed as a supporting bracket, a sheet metal shell permanently mounted thereon and cooperating with said base casting to form a reservoir, a pump cylinder formed in said casting and extending transversely thereof, a passage connecting said cylinder with said reservoir, and an air chamber mounted on said casting and adapted to receive the lubricant discharged from said cylinder.

4. A supply installation for a centralized lubricating system comprising a base casting, means for securing said base casting to a suitable support, means carried by said base casting and forming a lubricant reservoir, pump means communicating with said reservoir and carried by said base casting, and an air chamber carried by said base casting and adapted to receive the lubricant discharged by said pump means.

5. A supply installation for a centrized lubricating system comprising a base casting, means for securing said base casting to a suitable support, means carried by said base casting and forming a lubricant reservoir, pump means communicating with said reservoir and carried by said base casting, an air chamber supported by said base casting and adapted to receive lubricant discharged by said pump means, and means for manually priming said lubricating system secured to said base beyond said air chamber.

6. In a centralized lubricating system for intermittently lubricating the chassis bearings of an automobile, a lubricant reservoir, pumping means supplied therefrom, manual means for intermittently operating said pumping means, an air chamber adjacent said pumping means, said air chamber being of a size sufficient to accommodate substantially the entire discharge of said pump during a single period of operation, conduit means connecting said air chamber with the bearings to be lubricated, and means secured to said conduit means adjacent said reservoir for manually attaching a compressor to charge said air chamber and said system beyond said reservoir.

7. A combined unit for a centralized lubricating system, comprising a lubricant pump, a lubricant reservoir, a conduit connecting said pump and reservoir, a normally closed check valve in said conduit, and a coupling member adapted to be placed in communication with that part of said conduit on the pump side of said check valve, said coupling member providing means for attaching a lubricant dispensing means for priming said system and discharging air trapped therein.

OSCAR U. ZERK.